P. S. MILLER.
LOCK JOINT FOR PIPES.
APPLICATION FILED FEB. 24, 1915.
1,179,207.
Patented Apr. 11, 1916.
Fig. 1.
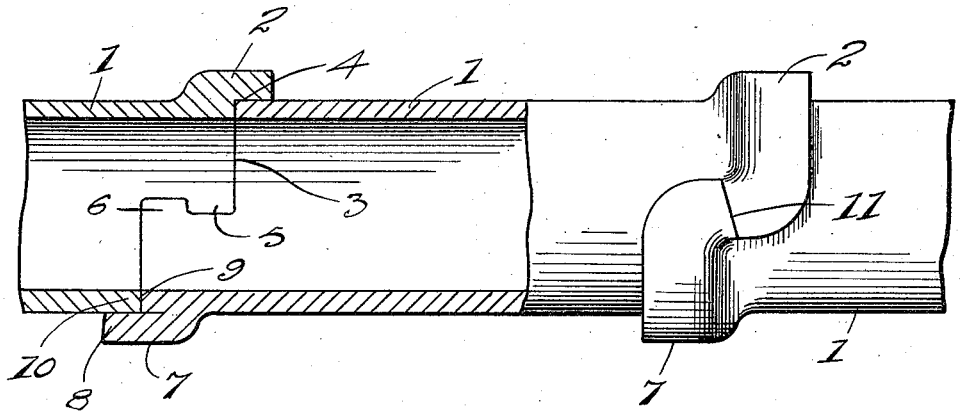
Fig. 2.
Fig. 3.
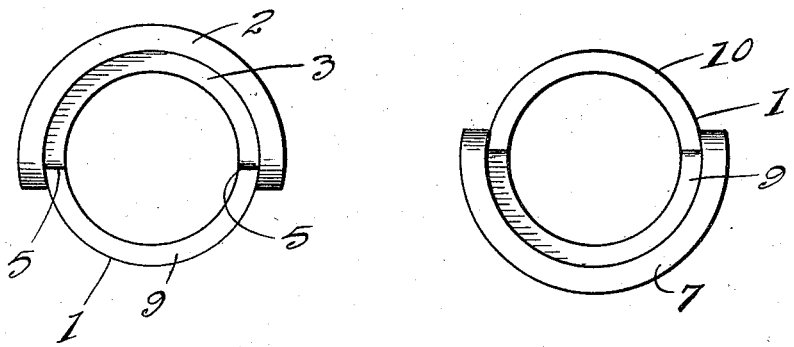
Witnesses
Inventor
P. S. Miller.
By
Attorney

UNITED STATES PATENT OFFICE.

PETER S. MILLER, OF COLUMBIA, SOUTH CAROLINA.

LOCK-JOINT FOR PIPES.

1,179,207.     Specification of Letters Patent.      Patented Apr. 11, 1916.

Application filed February 24, 1915. Serial No. 10,235.

*To all whom it may concern:*

Be it known that I, PETER S. MILLER, a citizen of the United States, residing at Columbia, in the county of Richland and State of South Carolina, have invented certain new and useful Improvements in Lock-Joints for Pipes; and I do hereby declare the following to be a full, clear, and exact description of the invention, such as will enable others skilled in the art to which it appertains to make and use the same.

This invention relates to lock joints for pipes, and one of the principal objects of the invention is to provide simple, reliable and efficient means for joining drain pipes, conduit pipes and pipes for other purposes and to provide a joint which can be easily connected one section of pipe to the other.

Another object of the invention is to provide a pipe section having at one or both of its ends lock members adapted to interlock with the next adjacent member in a reliable manner, so that each section may be removed without disturbing the remainder of the pipe, thus facilitating repairs and renewals.

The foregoing and other objects may be attained by means of the construction illustrated in the accompanying drawing, in which—

Figure 1 is a side elevation and partial longitudinal section of a lock joint for pipes made in accordance with this invention, Fig. 2 is a sectional view looking at the end of one of the pipe sections, and Fig. 3 is a similar view looking at the end of the next adjacent pipe section.

Referring to the drawing, the numeral 1 designates the pipe sections, each provided at one end with a bell or enlargement 2 at the upper side thereof forming a flange having a shoulder 3 against which abuts the end 4 of the next adjacent section. The bell 2 extends slightly more than half way around the pipe section 1, and the shoulder 3 is provided with an extended lug 5 which interlocks with the lug 6 formed on the next adjacent member or section of pipe. Each pipe section 1 has the bell 2 disposed at the upper side and at the opposite end has a bell 7 forming an enlargement having a flange 8 provided with a shoulder 9 which abuts against the outer edge 10 of the next adjacent pipe section. The bells or enlargements 2 and 7 are joined centrally by meeting of the inclined shoulders 11 as shown in Fig. 1, which provides a substantial locking joint for the pipe sections.

The adjacent pipe sections are interlocked as shown in Fig. 1 and may be held together by cement. Thus each pipe section is independent, and can be removed from a length of pipe and renewed whenever desired.

Various changes may be made in the details of construction without departing from the spirit and scope of the invention as defined in the claims.

What is claimed is:—

1. A pipe section provided with an enlargement at one end thereof, said enlargement having an outwardly extending flange and a downwardly extending portion formed at the inner end of said flange forming an inner tongue and providing a recess between the end of the pipe section and the inner end of the tongue adapted to receive the inner locking tongue of the opposite section, the inner edges of the enlargement being inclined to provide a double locking means in the adjacent pipe section in place thereupon.

2. A pipe section comprising an enlargement at one end, an interior shoulder formed in said enlargement, portions of the enlargement cut away, an incline provided with recesses to receive the tongue formed on the adjacent pipe section for locking the same together when assembled.

In testimony whereof I affix my signature in presence of two witnesses.

PETER S. MILLER.

Witnesses:
EDWARD C. ADAMS,
M. K. MILLER.

Copies of this patent may be obtained for five cents each, by addressing the "Commissioner of Patents, Washington, D. C."